(12) United States Patent
Ventura et al.

(10) Patent No.: US 12,415,204 B1
(45) Date of Patent: Sep. 16, 2025

(54) METHODS, DEVICES, AND SYSTEMS FOR MODULAR AND MOBILE AUTOMATED COATING OF TUBES AND TUBULAR ARRAYS USING ARTIFICIAL INTELLIGENCE

(71) Applicant: Oceanit Laboratories, Inc., Honolulu, HI (US)

(72) Inventors: Alexander Ventura, Houston, TX (US); Vinod Veedu, Houston, TX (US); Sumil Thapa, Houston, TX (US); Matthew A. Nakatsuka, Honolulu, HI (US); Phuong Dinh, Houston, TX (US)

(73) Assignee: Oceanit Laboratories, Inc., Honolulu, HI (US)

( * ) Notice: Subject to any disclaimer, the term of this patent is extended or adjusted under 35 U.S.C. 154(b) by 234 days.

(21) Appl. No.: 18/077,029

(22) Filed: Dec. 7, 2022

Related U.S. Application Data

(60) Provisional application No. 63/287,032, filed on Dec. 7, 2021.

(51) Int. Cl.
| | | |
|---|---|---|
| *G06T 1/00* | (2006.01) | |
| *B05D 1/02* | (2006.01) | |
| *B05D 1/36* | (2006.01) | |
| *B08B 9/043* | (2006.01) | |
| *B08B 13/00* | (2006.01) | |
| *G06T 7/60* | (2017.01) | |

(52) U.S. Cl.
CPC .............. *B05D 1/36* (2013.01); *B05D 1/02* (2013.01); *B08B 9/0436* (2013.01); *B08B 13/00* (2013.01); *G06T 1/0014* (2013.01); *G06T 7/60* (2013.01); *B08B 2209/04* (2013.01); *G06T 2200/24* (2013.01); *G06T 2207/30172* (2013.01)

(58) Field of Classification Search
None
See application file for complete search history.

(56) References Cited

U.S. PATENT DOCUMENTS

| | | | | |
|---|---|---|---|---|
| 5,947,213 | A  * | 9/1999 | Angle ................. | E21B 23/00 166/255.2 |
| 9,863,727 | B1 * | 1/2018 | Van Fleet ............. | B08B 9/0325 |
| 2013/0330466 | A1 * | 12/2013 | Lochner ............. | B05B 13/0431 118/688 |
| 2014/0092234 | A1 * | 4/2014 | Thomas ................ | B08B 9/0436 348/84 |
| 2020/0333093 | A1 * | 10/2020 | Ferguson ................ | F28G 15/04 |
| 2020/0356118 | A1 * | 11/2020 | Gromes, Sr. .......... | F28G 15/003 |

* cited by examiner

*Primary Examiner* — Michael P. Rodriguez
(74) *Attorney, Agent, or Firm* — Fresh IP PLC; Clifford D. Hyra; Aubrey Y. Chen

(57) ABSTRACT

Disclosed herein are methods, devices, and systems for automatically cleaning and/or coating the interior of tubes, tubulars, tubular arrays, and/or various other arrangements of tubes (e.g., tube stacks). A system for such automatic cleaning and/or coating may include (1) one or more applicator lances configured to be inserted into an interior of one or more tubes and/or tubulars, (2) coating and/or cleaning tools fitted at the end of the one or more applicator lances, (3) a drive assembly including drive motors, alignment equipment, and instrumentation, (4) a control box including a graphical user interface (GUI) for control of the system or one or more portions thereof, and (5) a computing system, which comprises one or more computing devices or processing units, for operating the system or one or more portions thereof.

23 Claims, 5 Drawing Sheets

METHODS, DEVICES, AND SYSTEMS FOR MODULAR AND MOBILE AUTOMATED COATING OF TUBES AND TUBULAR ARRAYS USING ARTIFICIAL INTELLIGENCE

CROSS-REFERENCE TO RELATED APPLICATION

This application claims priority to U.S. Provisional Application No. 63/287,032, filed Dec. 7, 2021, which is hereby incorporated by reference in its entirety.

STATEMENT REGARDING FEDERALLY SPONSORED RESEARCH OR DEVELOPMENT

The invention described herein was made with U.S. government ("Government") support under Contract No. DE-FE0031533, awarded by the U.S. Department of Energy (DOE). As a result, the Government has certain rights in this invention.

FIELD

The disclosure relates generally to methods, devices, and systems for automatically cleaning and/or coating the interior of tubes, tubulars, tubular arrays, and/or various other arrangements of tubes (e.g., tube stacks). In particular, embodiments of the disclosure include a system for automatic cleaning and/or coating that includes one or more applicator lances, one or more coating and/or cleaning tools fitted to the one or more applicator lances, and one or more computing devices to operate the system.

BACKGROUND

Tubulars made of a variety of materials (e.g., metals or metal alloys) are used in many industries and applications, such as the energy industry (including, for instance, mining and oil production), military and defense applications, and commercial and industrial applications. These tubulars often have irregular forms and geometries, and/or are positioned in different geometrical arrangements. Moreover, such tubulars often encounter, or are used in, environments that produce erosion, corrosion, and/or general wear of metal tubular walls.

As a result, much time and expense is spent in cleaning and coating tubulars. For instance, standard methods of cleaning used in the art include grit blasting or hydrolancing. Additionally, standard methods of coating use manual labor, often combined with compressed air-driven plugs with liquid, pigging, and rotating sprays.

Accordingly, difficulties in cleaning and coating result for tubulars having irregular or small interior surface geometries. Such geometries can result in non-uniform cleaning and coating, as well as long cleaning and coating times. Moreover, standard cleaning and coating methods are ill-equipped for geometrically complex or large-scale tubular configurations, such as, for instance, shell and tube heat exchangers that contain stacks of large diameter tubulars.

Given the foregoing, there exists a significant need for improved methods, devices, and systems that provide faster, more uniform coating and/or cleaning, and function effectively in irregular or complex tubular surface geometries or configurations.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In certain embodiments, the disclosed embodiments may include one or more of the features described herein.

Embodiments of the present disclosure are directed towards methods, devices, and systems for cleaning and/or coating tubes and/or tubulars, including different tubular arrangements (e.g., tube stacks). The aforementioned embodiments provide one or more benefits over standard methods, devices, and systems used in the art, including, for example, (1) eliminating or reducing the labor needed to manually clean and/or coat tubulars, (2) streamlining the cleaning and/or coating process, thereby resulting in a reduction of cleaning and/or coating times, and/or (3) functioning effectively in complex or large-scale tubular configurations (e.g., stacks of large diameter tubulars used in shell and tube heat exchangers).

In at least one embodiment, a novel cleaning and/or coating system is disclosed that comprises one or more applicator lances configured to be inserted into an interior of one or more tubes and/or tubulars; one or more coating and/or cleaning tools fitted on to the one or more applicator lances (e.g., at the end of the one or more applicator lances); one or more drive assemblies comprising one or more drive motors, alignment equipment, and instrumentation for operating the system or one or more portions thereof; one or more control boxes comprising a graphical user interface (GUI) for user control of the system or one or more portions thereof; and a computing system, which comprises one or more computing devices or processing units, for operating the system or one or more portions thereof.

The drive assembly may control the system in different ways depending on the interior surface geometry and/or the arrangement of the tubulars to be coated and/or cleaned. This enables quick and efficient cleaning and/or coating of the tubulars without manual labor.

The computing system, or portions thereof (e.g., a computing device), may be operated, in whole or in part, by artificial intelligence (AI). The AI may streamline the cleaning and/or coating process, thereby resulting in reduced cleaning and/or coating times. The AI may also enable more uniform cleaning and/coating of tubulars, resulting in increased efficiency of the cleaning and/or coating process.

Additionally, the aforementioned system may be situated on a mobile carriage or transport in order to facilitate movement and placement of the system.

These and further and other objects and features of the invention are apparent in the disclosure, which includes the above and ongoing written specification, as well as the drawings.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. The invention will be more particularly described in conjunction with the following drawings wherein.

DETAILED DESCRIPTION

Figure 1:
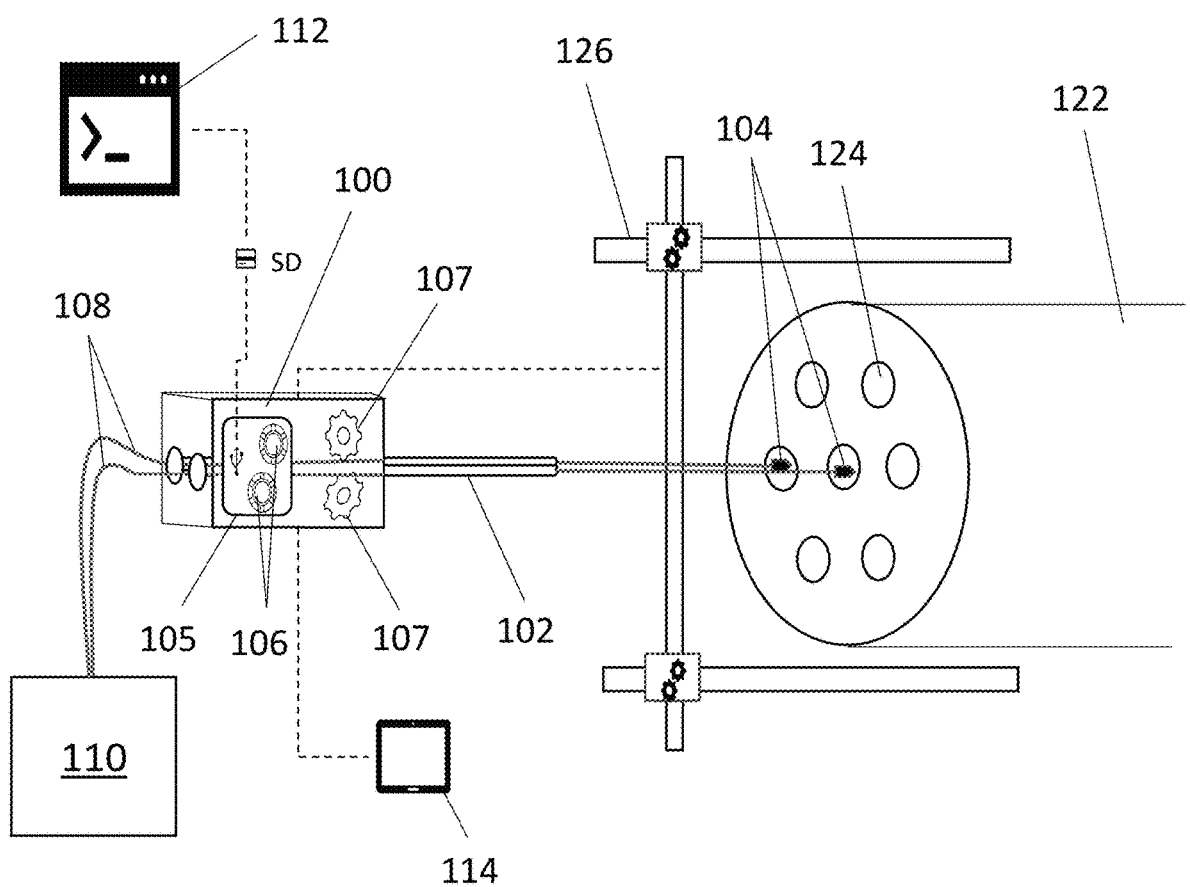
FIG. 1 is a diagram of a system for cleaning and/or coating a tubular surface, according to at least one embodiment of the present disclosure.

The present invention is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms "first," "second," etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

The words "comprise," "comprises," and "comprising" are to be interpreted inclusively rather than exclusively. Likewise, the terms "include," "including," and "or" should all be construed to be inclusive, unless such a construction is clearly prohibited from the context. The terms "comprising" or "including" are intended to include embodiments encompassed by the terms "consisting essentially of" and "consisting of." Similarly, the term "consisting essentially of" is intended to include embodiments encompassed by the term "consisting of." Although having distinct meanings, the terms "comprising," "having," "containing," and "consisting of" may be replaced with one another throughout the description of the invention.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Wherever the phrase "for example," "such as," "including" and the like are used herein, the phrase "and without limitation" is understood to follow unless explicitly stated otherwise.

"Typically" or "optionally" means that the subsequently described event or circumstance may or may not occur, and that the description includes instances where said event or circumstance occurs and instances where it does not.

In general, the word "instructions," as used herein, refers to logic embodied in hardware or firmware, or to a collection of software units, possibly having entry and exit points, written in a programming language, such as, but not limited to, Python, R, Rust, Go, SWIFT, Objective C, Java, JavaScript, Lua, C, C++, or C#. A software unit may be compiled and linked into an executable program, installed in a dynamic link library, or may be written in an interpreted programming language such as, but not limited to, Python, R, Ruby, JavaScript, or Perl. It will be appreciated that software units may be callable from other units or from themselves, and/or may be invoked in response to detected events or interrupts. Software units configured for execution on computing devices by their hardware processor(s) may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. Generally, the instructions described herein refer to logical modules that may be combined with other modules or divided into sub-modules despite their physical organization or storage. As used herein, the term "computer" is used in accordance with the full breadth of the term as understood by persons of ordinary skill in the art and includes, without limitation, desktop computers, laptop computers, tablets, servers, mainframe computers, smartphones, handheld computing devices, and the like.

In this disclosure, references are made to users and to their client computing devices/platforms. In general, the users and their computing devices are conceptually interchangeable. Therefore, it is to be understood that where an action is shown or described as being performed by a user, in various implementations and/or circumstances the action may be performed entirely by the user's computing device or by the user, using their computing device to a greater or lesser extent (e.g., a user may type out a response or input an action, or may choose form preselected responses or actions generated by the computing device). Similarly, where an action is shown or described as being carried out by a computing device, the action may be performed autonomously by that computing device or with more or less user input, in various circumstances and implementations.

In this disclosure, various implementations of a computer system architecture are possible, including, for instance, thin client (computing device for display and data entry) with fat server (cloud for app software, processing, and database), fat client (app software, processing, and display) with thin server (database), edge-fog-cloud computing, and other possible architectural implementations known in the art.

Embodiments of the disclosure comprise novel methods, devices, and systems for cleaning and/or coating tubes, tubulars, and/or arrangements or configurations thereof (e.g., tube stacks).

In at least one embodiment, a novel system for cleaning and/or coating tubulars comprises one or more applicator lances configured to be inserted into an interior of one or more tubes and/or tubulars, one or more coating and/or cleaning tools connected to the one or more applicator lances (e.g., fitted at the end of the one or more applicator lances), one or more drive assemblies comprising one or more drive motors, alignment equipment, and instrumentation for operating the system or one or more portions thereof, one or more control boxes comprising a graphical user interface (GUI) for user control of the system or one or more portions thereof, and a computing system, which comprises one or more computing devices or processing units, for operating the system or one or more portions thereof.

Turning now to FIG. 1, a non-limiting example of a cleaning and/or coating system 100 for tubulars is shown. The system 100 is connected to a tubular 122 via a mount 126. The tubular 122 has an inner surface 124 to be coated and/or cleaned. The system comprises one or more applicator lances 102, which are connected to one or more coating and/or cleaning tools 104. The coating and/or cleaning tools may be connected to the one or more applicator lances 102 by, for instance, fitting on to the ends of the one or more applicator lances. In operation, the coating and/or cleaning tools 104 are inserted into the tubular 122 to coat and/or clean the inner surface 124.

The system 100 further comprises a drive assembly 105, which comprises one or more drive motors, alignment equipment, and/or instrumentation for operating the system. Thus, the drive assembly 105 may comprise motors 106 and gears 107 for operating the one or more applicator lances 102 and/or the one or more coating and/or cleaning tools 104. A pneumatic feed 108 connects the system, or portions thereof, such as the drive assembly 105, with a source pump 110, thereby providing the requisite operating power.

The system 100 additionally comprises a computing system 112 for operating the system 100 or portions thereof. The computing system 112 may comprise one or more computing devices and/or processing units, which include one or more processors and software. The system further comprises a control box 114 that comprises a graphical user interface (GUI) so that a user may control the system or portions thereof, such as, for instance, the one or more applicator lances 102 and/or the one or more coating and/or cleaning tools 104 to position the tools (e.g., to physically contact the interior surface 124 of tubular 122). The computing system 112, as well as the control box 114, may be connected to the system via any electrical or other connectors known in the art.

In at least one embodiment, the computing system 112 may utilize artificial intelligence (AI) to enable even coating and/or cleaning of the tubular (e.g., to ensure an even coating thickness). The AI may further be used to streamline the cleaning and/or coating process, thereby resulting in reduced cleaning and/or coating times compared with methods, devices, and systems currently used in the art. In at least one example, the AI performs one or more of the aforementioned after being trained off of, and/or learning from, one or more sets of previous historical and/or collected data. The AI can therefore be trained to learn from previous coating and/or cleaning procedures to determine which coating and/or cleaning parameters were more effective for a given tubular. The AI can then optimize such parameters for integration into future coating and/or cleaning procedures.

It should be appreciated that a wide variety of coatings are suitable for use with the system 100, including anti-corrosion or anti-fouling coatings, coatings that reduce wear on the tubular surface due to chemical, thermal, and/or mechanical processes, and the like. In at least one embodiment, the system allows for application of coatings in highly confined, minimally accessible spaces, such as, for instance, the interior tubes of heat exchangers (roughly 0.5 inches in diameter), and large-scale transport pipelines (roughly thirty-six to forty-eight inches in diameter).

Figure 2:
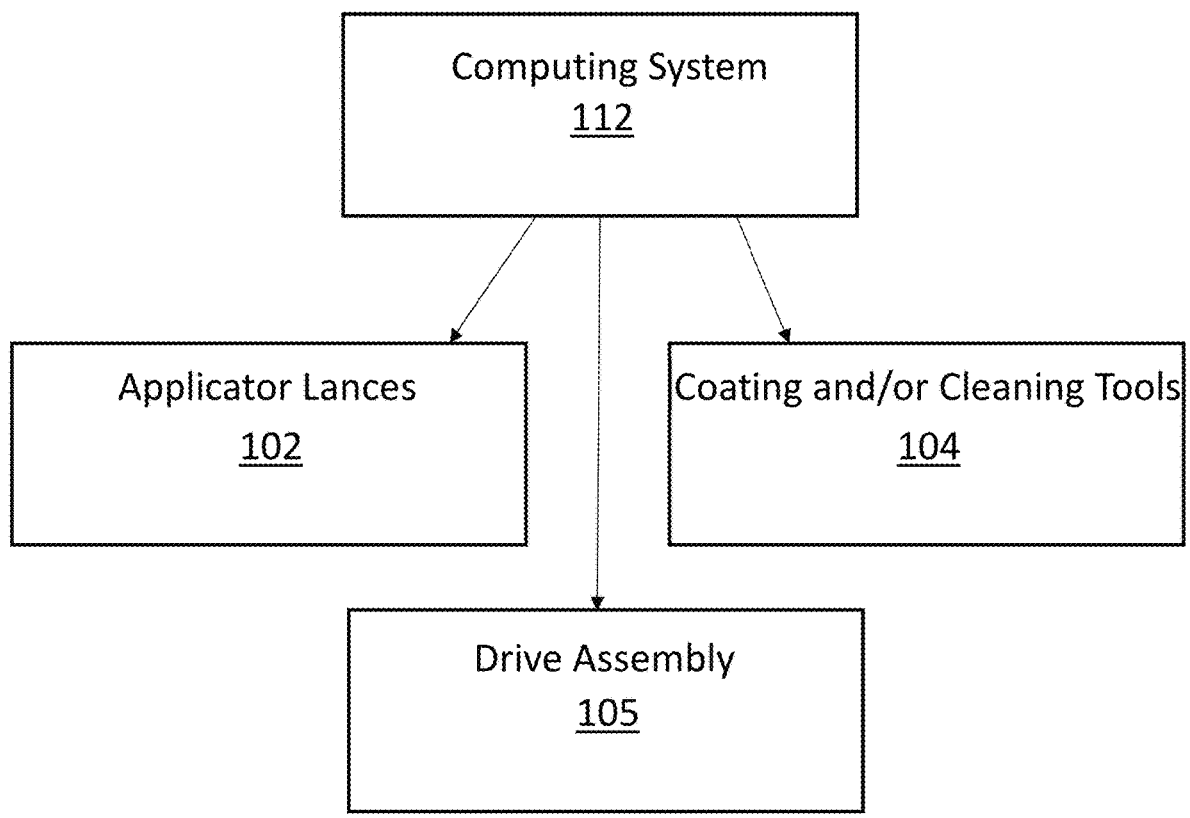
FIG. 2 is a diagram of a computing system for operating a system for cleaning and/or coating a tubular surface, according to at least one embodiment of the present disclosure.

Turning now to FIG. 2, a block diagram is shown of the computing system 112 according to an example embodiment. The computing system 112 may control, monitor, and/or extract data from one or more portions of the coating and/or cleaning system (e.g., system 100), including, for instance, the one or more applicator lances 102, the one or more coating and/or cleaning tools 104, and the drive assembly 105, as well as one or more portions of the drive assembly (e.g., motors, gears, alignment equipment, etc.). As stated above herein, the computing system may use AI and/or other similar methods, non-limiting examples of which are provided below.

One of skill in the art will recognize that tubes and/or tubulars vary in, e.g., diameter, length, composition material, and amount of scaling present. Accordingly, AI may monitor and/or adjust parameters of the one or more applicator lances 102 and/or the one or more coating and/or cleaning tools 104 to optimize their function. Such monitoring and/or adjustment may be based off of one or more data sets and/or data inputs from one or more sources (e.g., sensor measurements, including historical and/or real time collection of sensor data, historical data from previous coating and/or cleaning procedures, and quality control data, which may be historical and/or real time). Parameters that may be monitored and/or adjusted include, for instance, type and shape of spray plumes, alteration of spray plumes, droplet size, spray pressure, flow rates, feed rates, and the like. In at least one embodiment, the AI alters one or more of the aforementioned parameters as the one or more applicator lances 102 and/or the one or more coating and/or cleaning tools 104 move through the tubular to be cleaned and/or coated, thereby permitting the system 100 to adapt to changes in the tube's surface (e.g., dimensional changes, changes in the amount of coating and/or cleaning to be applied) that occur along its length. In at least a further embodiment, the AI records one or more of the aforementioned parameters to enable quality control of the coating and/or cleaning process.

Additionally, the AI may set up and/or operate one or more portions of the drive assembly 105 that are connected to the one or more applicator lances 102 and/or the one or more coating and/or cleaning tools 104. The AI may also control the drive assembly in order to move the applicator lances and/or coating and/or cleaning tools from one portion of a tubular to another, or from one tubular to another tubular, without the need for an operator. Such functionality may be achieved by utilizing one or more inputs that are either sensed by the system or pre-installed on the system (e.g., dimensions of a tubular, software-based scripts inputted into the system to allow for line-based functionality, similar to the usage of G-code (also known as RS-274) in, for instance, three-dimensional (3D) printers).

In at least another embodiment, photographic recognition and image capture are used such that, upon capture of a given image, the AI is capable of recognizing tubular placements and specifying the center location of each tubular. This recognition may be done post-calibration so that a specific spot in the tubular is designated as the origin point of the cleaning and/or coating, thereby eliminating the need for user input on where to start the cleaning and/or coating of a given tubular.

Figure 3:
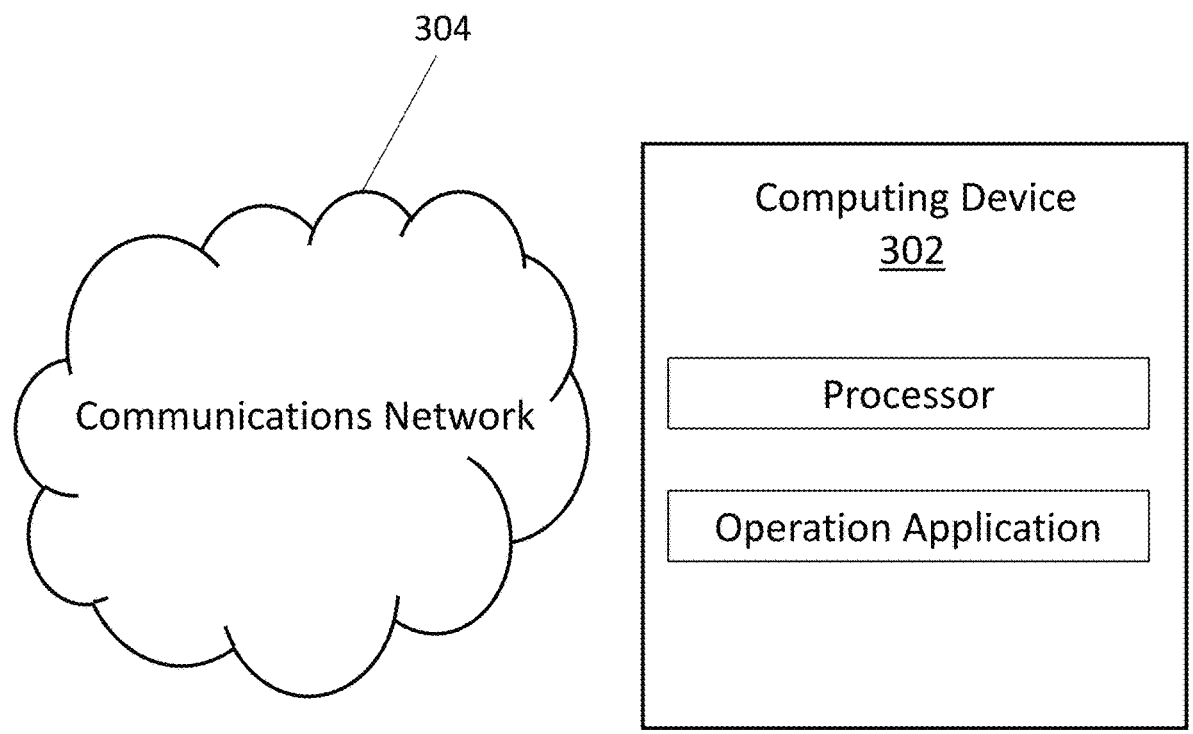
FIG. 3 is a diagram of one or more computing devices for operating a system for cleaning and/or coating a tubular surface, according to at least one embodiment of the present disclosure.

The computing system 112 may, in at least one embodiment, comprise one or more computing devices 302, as shown in FIG. 3. The one or more computing devices 302 may execute one or more applications to operate one or more portions of a cleaning and/or coating system (e.g., system 100), or portions thereof. Such applications may be driven, in whole or in part, by AI. A skilled artisan will appreciate that the one or more computing devices 302 may obtain, using methods or procedures known in the art, data associated with the cleaning and/or coating system (e.g., data regarding the coating and/or cleaning process, including time spent, thickness of any coating applied, etc.). Such data can be analyzed and/or interpreted by the aforementioned one or more applications. This analyzed and/or interpreted data can then be used to determine improvements in the cleaning and/or coating process (e.g., reduction in time of cleaning and/or coating).

The one or more computing devices 302 can be used to store acquired data from the cleaning and/or coating system, or portions thereof, as well as other data in memory and/or database. The memory may be communicatively coupled to one or more hardware processing devices which are capable of utilizing AI. Such data may include, for example, time spent on the coating and/or cleaning process, the thickness of any coating applied, and the like.

The one or more computing devices 302 may further be connected to a communications network 304, which can be the Internet, an intranet, or another wired or wireless communications network. For example, the communications network 304 may include a Mobile Communications (GSM) network, a code division multiple access (CDMA) network, 3rd Generation Partnership Project (GPP) network, an Internet Protocol (IP) network, a wireless application protocol (WAP) network, a Wi-Fi network, a satellite communications network, or an IEEE 802.11 standards network, as well as various communications thereof. Other conventional and/or later developed wired and wireless networks may also be used.

The one or more computing devices 302 include at least one processor to process data and memory to store data. The processor processes communications, builds communication relationships, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a portion or component of an operation application for operating a cleaning and/or coating system for tubulars (e.g., system 100) or portions thereof. In addition, the one or more computing devices 302 may further include at least one communications interface to transmit and receive communications, messages, and/or signals.

Thus, information processed by the one or more computing devices 302, or the applications executed thereon, may be sent to another computing device, such as a remote computing device, via the communications network 304. As a non-limiting example, information relating to the time spent on cleaning and/or coating a specific tubular or tubular configuration may be sent to one or more other computing devices.

Figure 4:
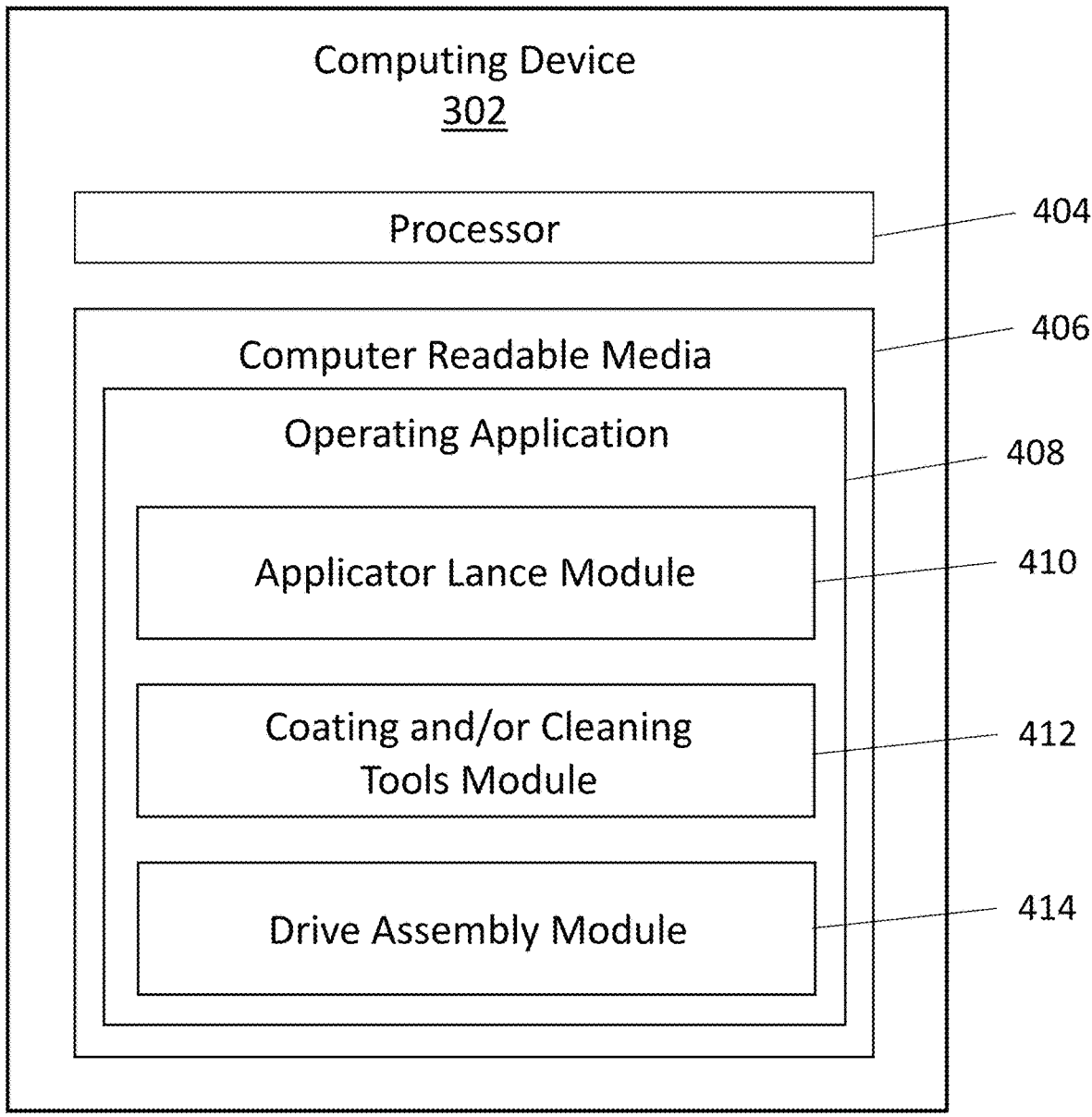
FIG. 4 is a diagram of a computing device including memory on which an operation application is stored for operating a system for cleaning and/or coating a tubular surface, according to at least one embodiment of the present disclosure.

FIG. 4 illustrates a block diagram of a computing device 302 according to an example embodiment. The computing device 302 includes computer readable media (CRM) 406 in memory on which an operating application 408 for operating a cleaning and/or coating system for tubulars (e.g., system 100) or portions thereof, or other user interface or application is stored. The computer readable media may include volatile media, nonvolatile media, removable media, non-removable media, and/or another available medium that can be accessed by the processor 404. By way of example and not limitation, the computer readable media comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media (e.g., Ethernet, Thunderbolt, serial, universal serial bus (USB), etc.) or system, both of which are hardware.

Such operation application 408 includes an applicator lance module 410, a coating and/or cleaning tools module 412, and a drive assembly module 414. The applicator lance module 410 is operable to control, monitor, and/or collect data from the one or more applicator lances 102. The coating and/or cleaning tools module 412 is operable to control, monitor, and/or collect data from the one or more coating and/or cleaning tools 104. Finally, the drive assembly module 414 is operable to control, monitor, and/or collect data from the drive assembly 105 or one or more portions thereof.

The operation application 408, or one or more of the aforementioned models therein, may be driven, in whole or in part, by AI. For instance, the AI may monitor and/or adjust operational parameters of the applicator lance module 410 and/or the coating and/or cleaning tools module 412. Such parameters include, for instance, type and shape of spray plumes, alteration of spray plumes, droplet size, spray pressure, flow rates, feed rates, and the like. In at least one embodiment, the AI utilizes sensor measurements and/or historical data to adjust the operational parameters to maximize efficiency of the coating and/or cleaning process. The AI may further adjust the operational parameters as the applicator lances 102 or the coating and/or cleaning tools 104 move through a given tubular that is undergoing coating and/or cleaning. Thus, the AI enables the operation application 408 to respond to dimensional changes in portions of the tubular, changes in the amount of coating and/or cleaning needed, and the like. In at least a further embodiment, the AI records one or more of the aforementioned parameters to enable quality control of the coating and/or cleaning process.

In at least one embodiment, the AI may operate the drive assembly module 414 to set up and/or operate one or more portions of the drive assembly 105. By so doing, the AI can control motors, gears, and/or alignment equipment connected to the one or more applicator lances 102 and/or the one or more coating and/or cleaning tools 104. The AI may also operate the drive assembly module 414 to control the drive assembly 105 in order to move the applicator lances and/or coating and/or cleaning tools from one portion of a tubular to another, or from one tubular to another tubular, without the need for an operator. Such functionality may be achieved by utilizing one or more inputs that are either sensed by the system or pre-installed on the system (e.g., dimensions of a tubular, software-based scripts inputted into the system to allow for line-based functionality, similar to the usage of G-code (also known as RS-274) in, for instance, 3D printers). In at least another embodiment, photographic recognition and image capture are used such that, upon capture of a given image, the AI is capable of recognizing tubular placements and specifying the center location of each tubular. This recognition may be done post-calibration so that a specific spot in the tubular is designated as the origin point of the cleaning and/or coating, thereby eliminating the need for user input on where to start the cleaning and/or coating of a given tubular.

Using a local high-speed network, the computing device 302 may receive the aforementioned one or more communications or messages from the cleaning and/or coating system (e.g., system 100) in real time or near real time so that operation of the system provided by operation application 408 can also be performed in real time or near real time.

In at least some embodiments, the computing device 302 can operate one or more feedback controls allowing alterations to the cleaning and/or coating process. Such alterations may be done, for instance, in response to different types of surface geometry in the interior of a tubular or in response to portions of the interior surface that require more or less cleaning and/or coating. The computing device 302 can further operate to implement additional procedures relating to the cleaning and/or coating process. A non-limiting example of such additional procedures is to gather and save data regarding the cleaning and/or coating process for a particular tubular or type of tubular so that the process is repeatable in the future.

Figure 5:
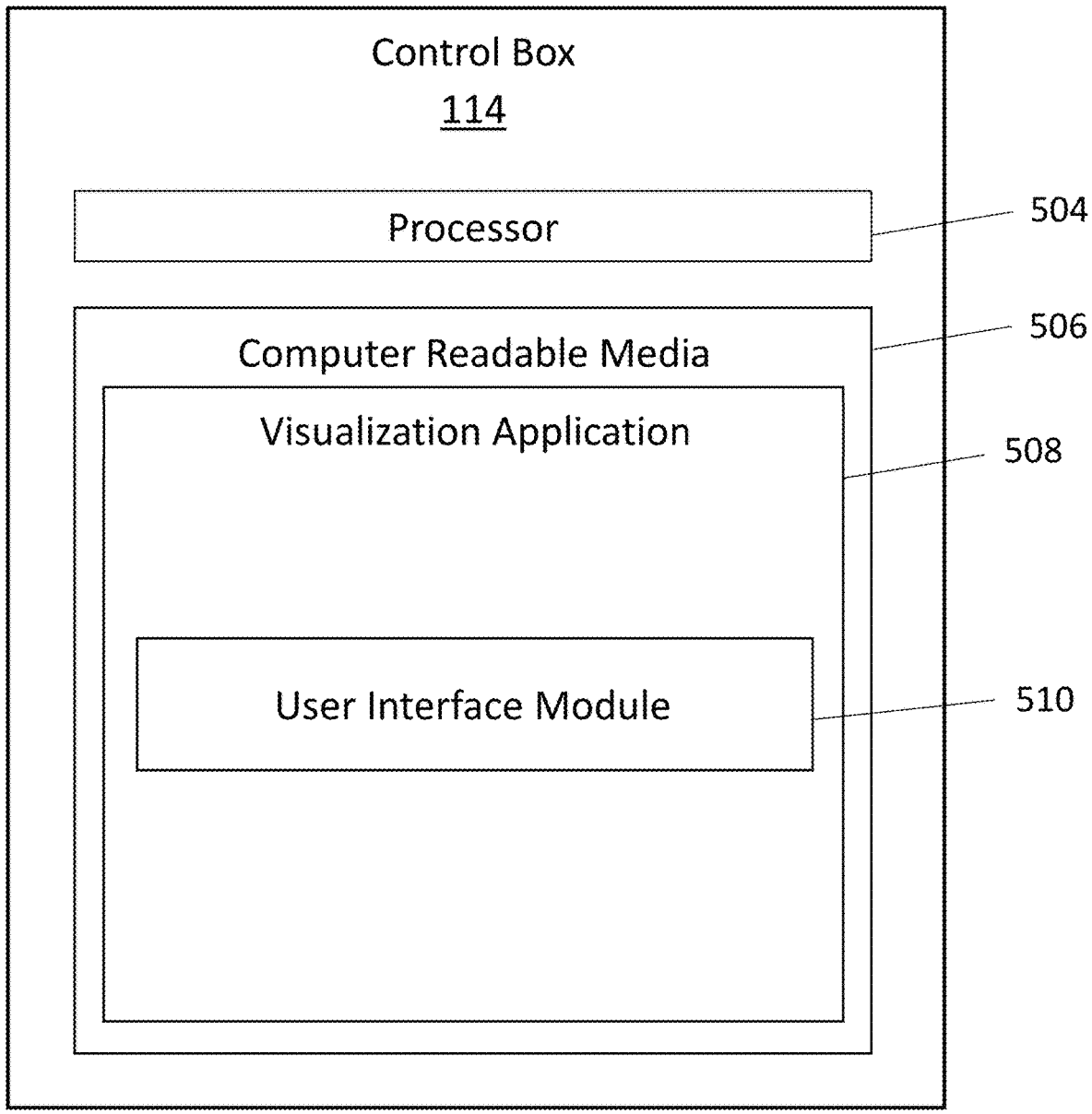
FIG. 5 is a diagram of a control box including memory on which a visualization application is stored for visualizing the operation of a system for cleaning and/or coating a tubular surface to a user, according to at least one embodiment of the present disclosure.

FIG. 5 illustrates a block diagram of the control box 114 according to an example embodiment. The control box may include at least one processor 504 to process data and memory to store data. The processor processes communications, builds communication relationships, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a portion or component of a visualization application 508 for visualizing the cleaning and/or coating process operated by a cleaning and/or coating system for tubulars (e.g., system 100). In addition, the control box 114 may further include at least one communications interface to transmit and receive communications, messages, and/or signals.

The control box includes computer readable media (CRM) 506 in memory on which the visualization application 508 or other user interface or application is stored. The computer readable media may include volatile media, non-volatile media, removable media, non-removable media, and/or another available medium that can be accessed by a processor 504. By way of example and not limitation, the computer readable media comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media (e.g., Ethernet, Thunderbolt, serial, universal serial bus (USB), etc.) or system, both of which are hardware.

Using a local high-speed network, the control box 114 may receive the aforementioned one or more communications or messages from the cleaning and/or coating system (e.g., system 100) in real time or near real time so that visualization of the cleaning and/or coating process provided by visualization application 508 can also be performed in real time or near real time.

Methods or processes, such as the cleaning and/or coating process run by, e.g., the operation application 408, may be monitored to generate an event and an alert upon the occurrence of a given condition (e.g., an error in the cleaning and/or coating process). Such alerts may be sent in real-time or near real-time using an existing uplink or dedicated link. The alerts may be sent using email, SMS, push notification, or using an online messaging platform to end users and computing devices. The alerts may also be displayed to the control box 114 via, for instance, visualization application 508.

In at least some embodiments, the control box 114 can operate one or more feedback controls allowing alterations to the cleaning and/or coating process. Such alterations may be done, for instance, in response to different types of surface geometry in the interior of a tubular or in response to portions of the interior surface that require more or less cleaning and/or coating. The control box 114 can further operate to implement additional procedures relating to the cleaning and/or coating process. A non-limiting example of such additional procedures is to gather and save data regarding the cleaning and/or coating process for a particular tubular or type of tubular so that the process is repeatable in the future.

The visualization application 508 may provide data visualization using a user interface module 510 for displaying a user interface on a display device. As an example, the user interface module 510 generates a native and/or web-based graphical user interface (GUI) that accepts input and provides output viewed by users of the control box 114. The control box 114 may provide real-time automatically and dynamically refreshed information on the status and/or content of one or more messages or communications, the operation of the cleaning and/or coating process, etc. The user interface module 510 may send data to, and retrieve data from, other modules (e.g., modules of the operation application 408) asynchronously without interfering with the display and behavior of the user interface displayed by the control box 114.

Accordingly, embodiments of the disclosure provide cost-effective cleaning and/or coating of tubulars, including tubulars with unusual or arbitrary interior surface geometries. Non-limiting examples of these tubulars include shell and tube heat exchangers, pipe stacks used for pipeline construction, and the like. Such cost-effective cleaning and/or coating can therefore provide substantial value for, among others, defense companies, energy companies, and industrial manufacturing companies.

These and other objectives and features of the invention are apparent in the disclosure, which includes the above and ongoing written specification.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

The invention is not limited to the particular embodiments illustrated in the drawings and described above in detail. Those skilled in the art will recognize that other arrangements could be devised. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the invention has been described with reference to specific illustrative embodiments, modifications and variations of the invention may be constructed without departing from the spirit and scope of the invention as set forth in the following claims.

We claim:

1. A system for monitoring a tubular, the system comprising:
    one or more applicator lances configured to be inserted into an interior of a tubular;
    one or more tools connected to at least one end of the one or more applicator lances;
    a drive assembly comprising one or more motors and one or more gears, connected to the one or more applicator lances; and
    at least one computing device having at least one processor operatively connected to at least one non-transitory computer readable storage medium, the at least one non-transitory computer readable storage medium having computer-executable instructions stored thereon, wherein, when executed by the at least one processor, cause the at least one processor to execute operations comprising:
        displaying a graphical user interface (GUI) configured to enable a user of the system to:
            operate the drive assembly to move the one or more applicator lances from an exterior of the tubular into the interior of the tubular,
            operate the drive assembly to move the one or more applicator lances within the interior of the tubular,
            operate the drive assembly to position the one or more applicator lances such that the one or more tools physically contact a surface of the interior of the tubular, and
            operate the one or more tools to at least one of clean the interior surface and coat the interior surface, and
        altering, based on changes in the interior surface, at least one of: (i) an amount of cleaning of the interior surface, thereby enabling even cleaning of the interior surface, and (ii) an amount of coating of the interior surface, thereby enabling even coating of the interior surface.

2. The system of claim 1, wherein the coating of the interior surface is performed using a coating selected from the group consisting of: an anti-corrosion coating, an anti-fouling coating, a coating that reduces wear on the interior surface, and combinations thereof.

3. The system of claim 1, wherein the at least one computing device utilizes artificial intelligence (AI) to optimize at least one of time to clean the interior surface and time to coat the interior surface.

4. The system of claim 1, wherein the at least one computing device utilizes artificial intelligence (AI) to at least one of: monitor one or more performance parameters of the one or more applicator lances and the one or more tools, and adjust the one or more performance parameters.

5. The system of claim 4, wherein the one or more performance parameters are calculated from data collected by one or more sensors.

6. The system of claim 4, wherein the one or more performance parameters are selected from the group consisting of: type of spray plumes, shape of the spray plumes, alteration of the spray plumes, droplet size, spray pressure, flow rate, feed rate, and combinations thereof.

7. The system of claim 6, wherein the operations further comprise:
    altering at least one of the one or more performance parameters as the one or more applicator lances move through the tubular.

8. The system of claim 1, wherein the operations further comprise:
extracting data collected by at least one of the one or more applicator lances, the one or more tools, and the drive assembly.

9. A system for monitoring a tubular, the system comprising:
one or more lances, wherein each of the one or more lances has a first end and a second end;
one or more tools, wherein at least one of the one or more tools is connected to each of the one or more lances at the first end;
a drive assembly connected to each of the one or more lances at the second end, wherein the drive assembly is configured to insert the one or more lances into a tubular;
at least one computing device having at least one processor operatively connected to at least one non-transitory computer readable storage medium, the at least one non-transitory computer readable storage medium having computer-executable instructions stored thereon, wherein, when executed by the at least one processor, cause the at least one processor to execute operations comprising:
operating the one or more lances,
operating the one or more tools, and
applying a coating to an interior surface of the tubular, and
monitoring one or more parameters relating to spray plumes in applying the coating to the interior surface.

10. The system of claim 9, wherein the coating is selected from the group consisting of: an anti-corrosion coating, an anti-fouling coating, a coating that reduces wear on the interior surface, and combinations thereof.

11. The system of claim 9, wherein the operations further comprise:
collecting data regarding at least one of the operation of the one or more lances and the operation of the one or more tools,
storing the data, and
analyzing the data to improve at least one of the operation of the one or more lances and the operation of the one or more tools.

12. The system of claim 11, wherein the data is selected from the group consisting of: time spent on the applying the coating to the interior surface, amount of a coating applied on the interior surface, thickness of the coating applied, dimensions of the interior of the tubular, one or more areas of the interior surface that require differential amounts of coating, and combinations thereof.

13. The system of claim 9, wherein the operations further comprise:
monitoring one or more operational parameters, and
adjusting the one or more operational parameters.

14. The system of claim 13, wherein the one or more operational parameters are selected from the group consisting of: type of spray plumes, shape of the spray plumes, alteration of the spray plumes, droplet size, spray pressure, flow rate, feed rate, and combinations thereof.

15. The system of claim 13, wherein the adjusting is performed during at least one of the operating the one or more lances, and the operating the one or more tools.

16. A method for monitoring a tubular, the method comprising:
inserting one or more lances into an interior of the tubular, wherein the one or more lances are attached to one or more tools;
gathering, by at least one processor, data from the interior of the tubular;
analyzing, by the at least one processor, the data to determine at least one of: a first surface area of the interior to be cleaned and a second surface area of the interior to be coated;
performing, by the one or more tools, at least one of: cleaning the first surface area and coating the second surface area;
monitoring, by the at least one processor, one or more operational parameters;
adjusting, by the at least one processor, the one or more operational parameters during the performing;
capturing, by the at least one processor, one or more images of the interior of the tubular;
calculating, by the at least one processor, a center point of the interior of the tubular based on the one or more images; and
designating, by the at least one processor, a specific spot in the interior of the tubular as an origin point for at least one of: cleaning the first surface area and coating the second surface area.

17. The method of claim 16, wherein the data is selected from the group consisting of:
time spent on the cleaning of the first surface area,
amount of the first surface area cleaned,
time spent on the coating of the second surface area,
amount of the second surface area coated,
amount of coating applied to the second surface area,
dimensions of the interior of the tubular, and
combinations thereof.

18. The method of claim 17, wherein the one or more operational parameters is selected from the group consisting of:
type of spray plumes,
shape of the spray plumes,
alteration of the spray plumes,
droplet size,
spray pressure,
flow rate,
feed rate, and
combinations thereof.

19. The method of claim 16, further comprising:
recording, by the at least one processor, the adjusted one or more operational parameters; and
operating, by the adjusted one or more operational parameters, at least one of the one or more lances and the one or more tools.

20. The method of claim 16, wherein the designating the specific spot in the interior of the tubular as the origin point is performed automatically without user input.

21. The system of claim 9, wherein the operations further comprise:
moving, without input from a user of the system, the one or more lances and the one or more tools from (i) one portion of the tubular to another portion of the tubular, or (ii) the tubular to another tubular.

22. The system of claim 13, wherein the adjusting of the one or more operational parameters is performed in response to a difference in an amount of the coating required between different areas of the interior of the tubular.

23. The method of claim 16, further comprising:
   analyzing, by the at least one processor, the data to reduce at least one of: a time required to clean the first surface area and a time required to coat the second surface area.

* * * * *